INVENTOR
Walter P. McKain

April 29, 1958
W. P. McKAIN
2,832,236
MACHINE FOR DRESSING TOOLS
Filed June 2, 1955
8 Sheets-Sheet 3
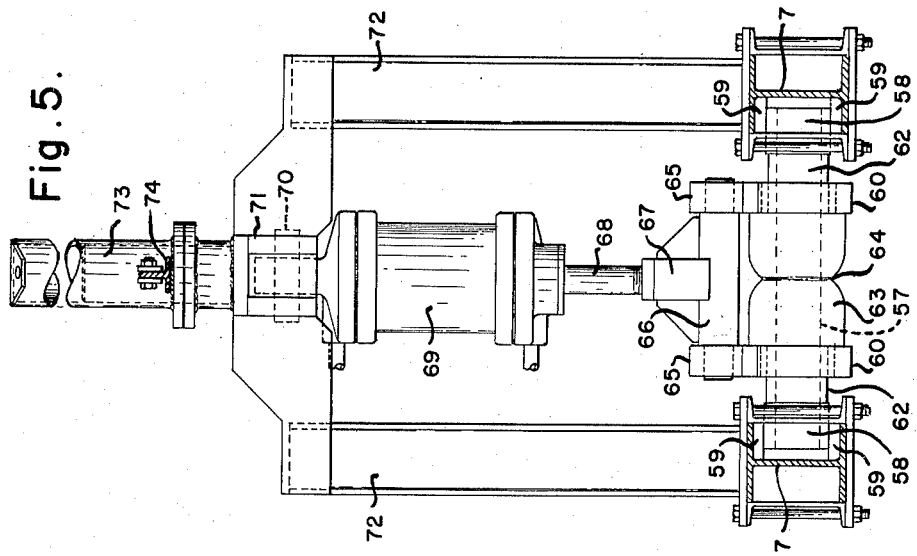
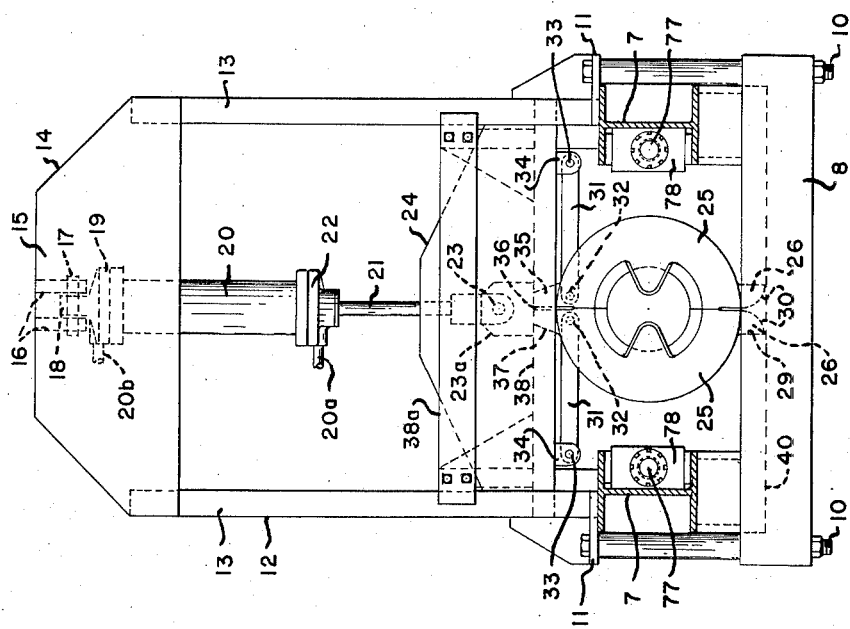
INVENTOR
Walter P. McKain INVENTOR
Walter P. McKain April 29, 1958  W. P. McKAIN  2,832,236
MACHINE FOR DRESSING TOOLS
Filed June 2, 1955  8 Sheets-Sheet 5

INVENTOR
Walter P. McKain

April 29, 1958 W. P. McKAIN 2,832,236
MACHINE FOR DRESSING TOOLS
Filed June 2, 1955 8 Sheets-Sheet 6
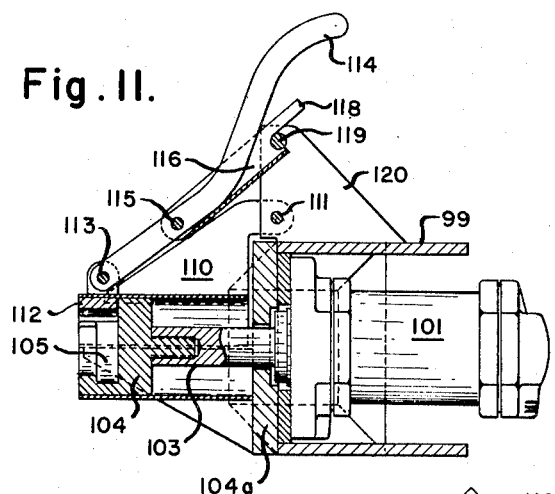
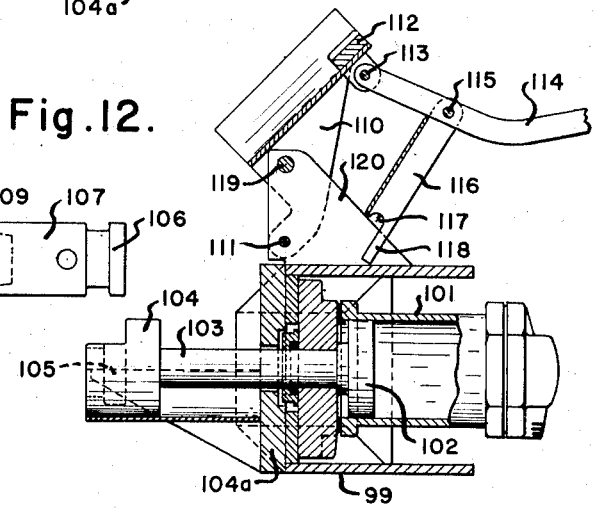
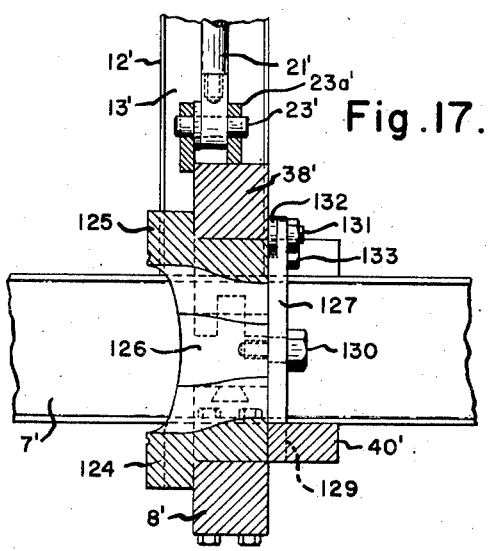
INVENTOR
Walter P. McKain April 29, 1958

W. P. McKAIN 2,832,236

MACHINE FOR DRESSING TOOLS

Filed June 2, 1955

INVENTOR
Walter P. McKain

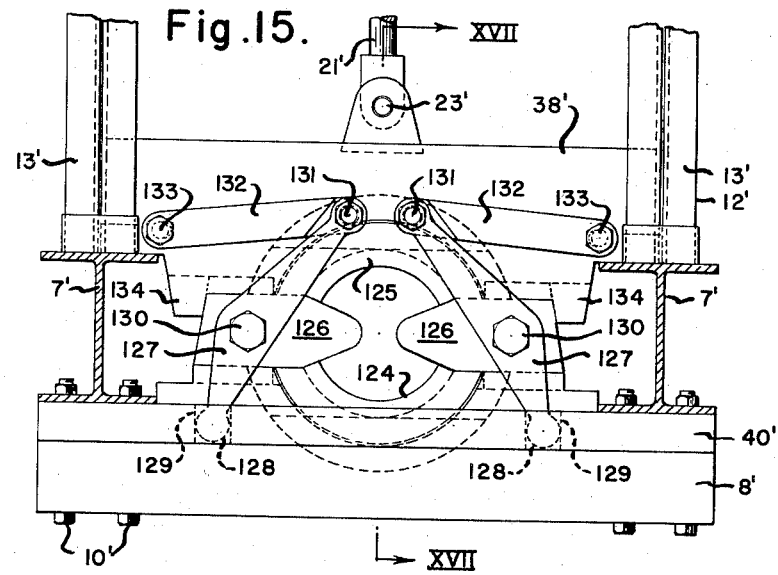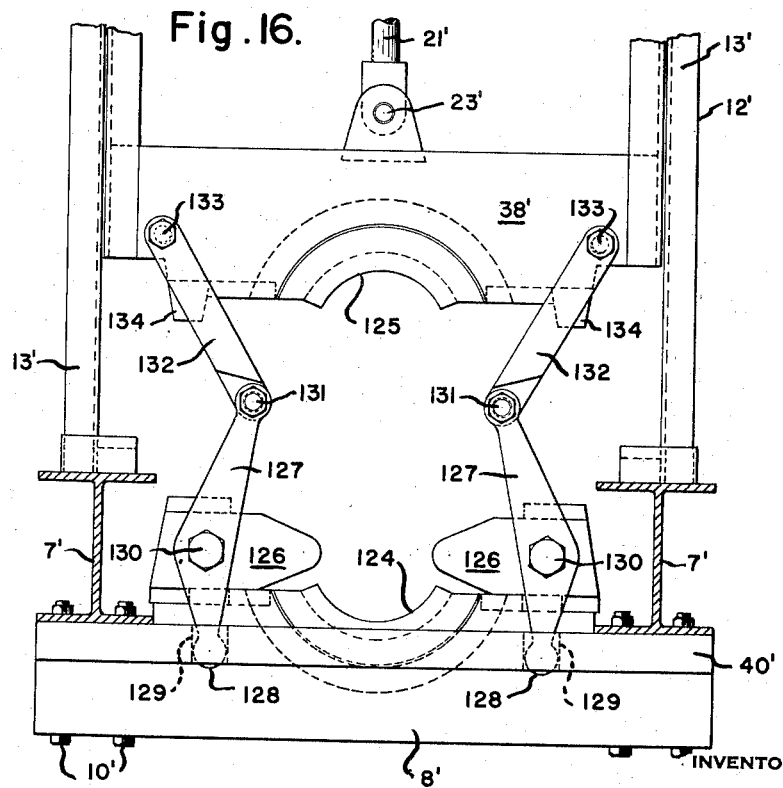

United States Patent Office 2,832,236
Patented Apr. 29, 1958

2,832,236

MACHINE FOR DRESSING TOOLS

Walter P. McKain, Parkersburg, W. Va., assignor to Stardrill-Keystone Company, Pittsburgh, Pa., a corporation of Pennsylvania Application June 2, 1955, Serial No. 512,764

21 Claims. (Cl. 76—5)

This invention relates to a machine for dressing tools having a number of improved features whereby important advantages over prior tool dressing machines are obtained.

One use of my machine is in the dressing of tools or bits used for drilling wells. Such tools may be very heavy and cumbersome, having a transverse dimension of four inches or more and a length of several feet and being made of metal, normally hardenable steel. When a tool has become dull through use it is dressed or resharpened, i. e., its operative or cutting end is operated on to restore substantially its initial contour and sharpness. That may be done by hot forging in a so-called tool dressing machine.

One of the improved features of my tool dressing machine is the dressing die. I may provide complementary die members together with means mounting the die members for movement between open inoperative position permitting a tool to be dressed to be introduced therebetween and closed operative position forming a die embracing the tool and means mounted for movement transversely of the axis of the die toward and away from the die members cooperating with the die members when the die members are in operative position and said last mentioned means are moved toward the die members to hold the die members in operative position.

In a preferred form of machine for dressing tools I provide opposed complementary die members together with means mounting the die members for swinging movement substantially about adjacent portions of the die members between open inoperative position permitting a tool to be dressed to be introduced therebetween and closed operative position forming a die embracing the tool, a member mounted for movement transversely of the axis of the die toward and away from the die members and cooperating means on said last mentioned member and the die members acting when the die members are in operative position and said last mentioned member is moved toward the die members to hold the die members in operative position.

A guideway may be provided extending transversely of the axis of the die and a crosshead may be mounted for movement in the guideway toward and away from the die members. Means may be provided for moving the crosshead in the guideway and links may be provided linking the crosshead with the respective die members causing the die members to move to inoperative position when the crosshead is moved away from the die members and causing the die members to move to operative position when the crosshead is moved toward the die members, the crosshead also having means cooperating with the die members when the die members are in operative position and the crosshead is moved toward the die members to hold the die members in operative position.

The complementary die members may include a substantially fixed die member and at least one other die member movable relatively to the substantially fixed die member between open inoperative position relatively thereto permitting a tool to be dressed to be introduced therebetween and closed operative position relatively to the substantially fixed die member forming a die embracing the tool and means engaging at least certain of the die members when the die members are in operative position to hold the die members in operative position.

My machine for dressing tools may comprise a dressing die, means for supporting a tool in cooperative relationship with the dressing die during dressing of the tool, means for withdrawing the dressed tool from the dressing die generally axially of the dressing die and a trimming die through which the dressed portion of the tool passes upon withdrawal from the dressing die for trimming flash from the tool.

My machine for dressing tools may comprise a frame, a dressing die mounted in the frame adapted to receive a portion of a tool to be dressed, a dressing member cooperable with the dressing die and movable relatively thereto to dress the tool, means for pressing the dressing member toward the dressing die and means mounted on the frame in fixed position axially of the dressing die moving the dressing member transversely of the dressing die.

The dressing member may be in the form of a dressing roll cooperable with the dressing die and movable relatively thereto to dress the tool and mounting means may be provided rotatably carrying the dressing roll. Means may also be provided for pressing the mounting means toward the dressing die and means may further be provided mounted in fixed position axially of the dressing die moving the mounting means transversely of the dressing die.

In one form which may machine for dressing tools may take a dressing die is adapted to receive a portion of the tool to be dressed and a dressing member cooperable with the dressing die may be provided which is movable relatively to the dressing die to dress the tool.

A tool actuating carriage may be provided which is movable toward and away from the dressing die and tool engaging means may be carried by the carriage. Means for moving the tool engaging means relatively to the carriage away from the dressing die may also be carried by the carriage. Screw means may be provided for moving the carriage along the frame and piston and cylinder means may be provided for moving the tool engaging means relatively to the carriage away from the dressing die.

In a preferred structure my machine for dressing tools may comprise a dressing die, a trimming die in general alignment with the dressing die and adapted to trim flash from a dressed tool withdrawn from the dressing die through the trimming die, a tool actuating carriage disposed so that the trimming die is between the carriage and the dressing die, the carriage being movable toward and away from the trimming die, tool engaging means being carried by the carriage and means for moving the tool engaging means relatively to the carriage away from the trimming die also being carried by the carriage.

The machine may comprise a frame, a dressing die carried by the frame, a trimming die in general alignment with the dressing die and adapted to trim flash from a dressed tool withdrawn from the dressing die through the trimming die, the dressing and trimming dies being openable to permit insertion of a tool and closable generally about the tool, a tool actuating carriage disposed so that the trimming dis is between the carriage and the dressing die, the carriage being movable along the frame toward and away from the dressing die, screw means for moving the carriage along the frame, tool engaging means carried by the carriage and piston and cylinder means also carried by the carriage for moving the tool engaging means relatively to the carriage away from the trimming die. Latch means may be provided for latching the tool engaging means to a tool, which may be effected through an adapter.

Other details, objects and advantages of the invention will become apparent as the following description of certain present preferred embodiments thereof proceeds.

In the accompanying drawings I have shown certain present preferred embodiments of the invention, in which Figure 1 is a side elevational view of a machine for dressing tools, the conduits for conducting the impelling hydraulic fluid and the fluid control valves being omitted for greater clarity of showing of the other elements of the machine;

Figure 4 is a vertical transverse cross-sectional view to enlarged scale taken on the line IV—IV of Figure 1 and showing the dressing die in operative position;

Figure 5 is a vertical transverse cross-sectional view to enlarged scale and with a portion cut away taken on the line V—V of Figure 1 showing the dressing roll and a portion of its operating mechanism;

Figure 11 is a fragmentary vertical longitudinal cross-sectional view taken on the line XI—XI of Figure 9;

Figure 12 is a view similar to Figure 11 but showing the latch means in inoperative position, this figure also showing in chain lines a portion of a tool to be dressed and in solid lines an adapter threaded onto the end of the tool;

Figure 15 is a vertical transverse cross-sectional view showing a modified form of dressing die, the die being in operative position;

Figure 16 is a view similar to Figure 15 showing the die in open or inoperative position for receiving a tool to be dressed; and Figure 17 is a vertical longitudinal cross-sectional view to enlarged scale taken on the line XVII—XVII of Figure 15.

Figure 1:
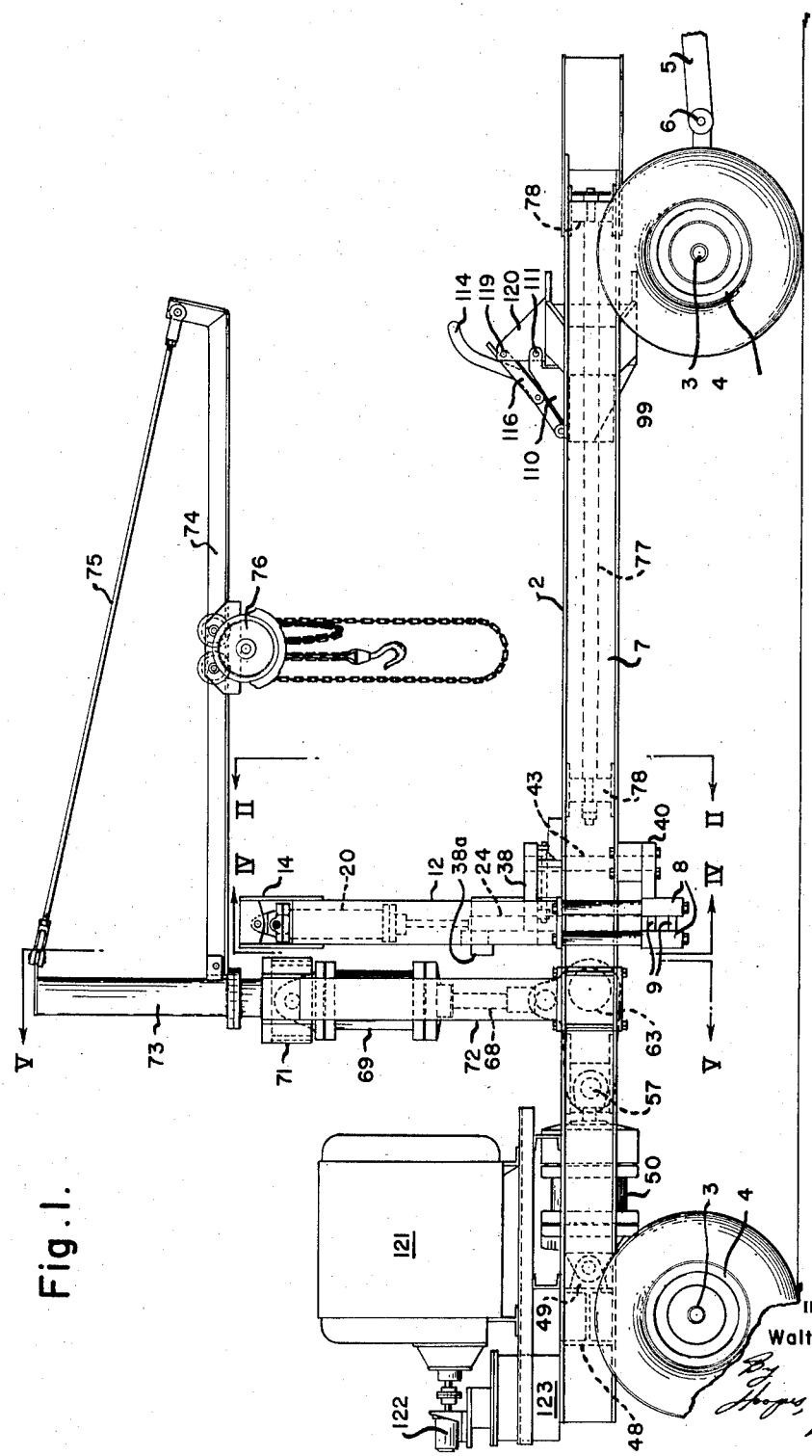

Referring now more particularly to the drawings, the tool dressing machine comprises a frame or chassis designated generally by reference numeral 2 carrying axles 3 each of which has a tired wheel 4 at each end thereof to form a mobile supporting structure for the machine. While the machine might if desired be self-propelled, it has not been so shown, a connector 5 pivoted to a portion of the chassis at 6 being shown for moving the machine from place to place. The machine is small enough that when it is to be transported long distances it can be loaded onto and carried by an automobile truck.

The chassis or frame 2 has two parallel longitudinally extending principal members in the form of H-beams 7. The H-beams 7 are connected transversely by cross members and serve to support the operative elements of the machine. Carried by the frame 2 below the H-beams 7 intermediate the ends of the machine are two cross bars 8 (Figures 4 and 6) connected together by connecting members 9. Each of the cross bars 8 is carried by a bolt 10 at each end of the cross bar, the bolts passing through plates 11 shown in Figure 4 welded to the upper surfaces of the H-beams 7.

Supported by the frame 2 and projecting upwardly therefrom is a superstructure 12 comprising opposed uprights 13 connected together by a cap structure 14. The cap structure 14 comprises opposed plates 15 with cross members 16 welded therebetween. A pin 17 extends through the cross members 16 and through a projection 18 on the upper cylinder head 19 of a generally vertical cylinder 20. A piston operates in the cylinder 20 and has a piston rod 21 emerging through the lower cylinder head 22. The piston rod 21 is pivoted at 23 to a flange 23a connected with and projecting upwardly from a crosshead 38 which is mounted for vertical guided movement in the superstructure 12.

Figure 6:
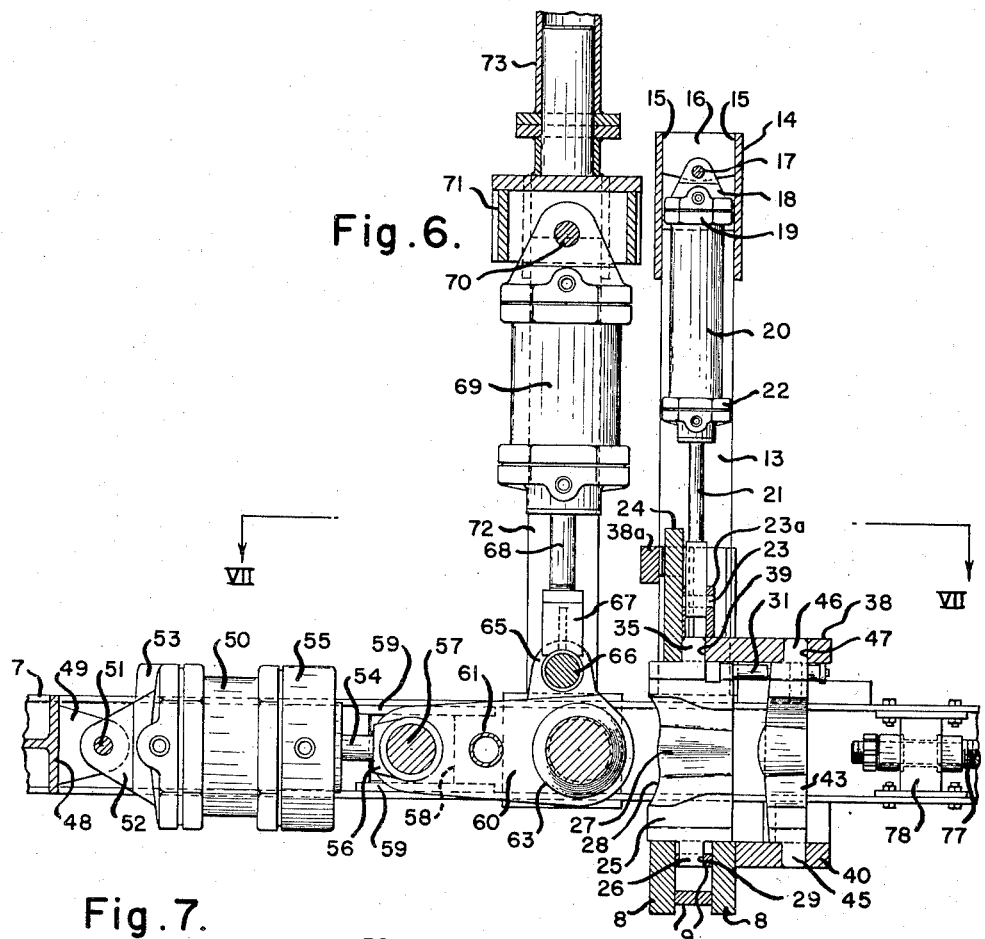
Figure 6 is a fragmentary vertical longitudinal cross-sectional view to enlarged scale of a portion of the structure of the machine shown in Figure 1.

One form of dressing die is shown in Figures 4 and 6, the die comprising opposed halves 25 of exteriorly generally semi-circular shape each having a downward projection 26 at its bottom and each being shaped interiorly to conform to half of the cross-sectional shape of a tool to be dressed, inward projections 27 being provided for fitting into the water courses of the tool. The operative face of the dressing die consisting of the halves 25 is indicated by reference numeral 28 in Figure 6 and is designed for cooperation with a dressing roll presently to be described to assist in shaping the operative end of the tool being dressed under hot forging action by the dressing roll. As will presently be described, the dressing roll is pressed toward the right viewing Figure 6 against the operative face of the dressing die while the cutting end of the tool is disposed therein, the operative face of the dressing die guiding the dressing roll and cooperating therewith in shaping the tool.

The downward projections 26 of the die halves or members 25 are received within an opening 29 in the upper connecting member 9, the effect being to enable the die members 25 to be moved to open position by each being turned outwardly with its projection 26 engaged within the opening 29 and acting somewhat in the nature of a pivot. The inner faces 30 of the projections 26 are rounded as shown in Figure 4 to permit lateral outward turning of the respective die members without binding or interference with each other.

Two links 31 are provided, each being pivoted at one end at 32 to one of the dressing die members 25 adjacent the upper portion thereof and pivoted at the other end at 33 to a lug 34 connected with the crosshead 38 and projecting downwardly therefrom. Each of the die members 25 has at its upper portion an upward projection 35, the upward projections 35 having vertical inner faces 36 and inclined outer faces 37 as shown in Figure 4. The crosshead 38 has therein an opening 39 (Figure 6) tapered from relatively great transverse dimension at the bottom to relatively small transverse dimension at the top and adapted when the parts are in operative position as shown in Figure 4 to engage and press inwardly toward each other the projections 35 whereby to hold the die members 25 firmly in operative position.

The die members 25 have substantial axial extent as shown in Figure 6 and are supported upon the cross bars 8 with the downward projections 26 extending downwardly between the cross bars and entering the opening 29.

When a tool to be dressed is to be inserted into the dressing die the piston in the cylinder 20 is moved upwardly by admitting fluid under pressure below the piston through the fluid connection 20a. Upward movement of the piston in the cylinder 20 raises the crosshead 38. As the crosshead 38 is raised it moves upwardly out of holding relationship to the projections 35, and continued upward movement of the crosshead causes the links 31 to pull the upper portions of the die members 25 apart so that those die members pivot outwardly generally about the opening 29. When a tool to be dressed has been inserted into the die the operation is reversed, fluid under pressure being admitted above the piston in the cylinder 20 through the fluid connection 20b to move the piston downwardly to in turn move the crosshead 38 downwardly. Downward movement of the crosshead 38 causes the links 31 to move the upper portions of the die members 25 inwardly toward each other so that the dressing die assumes operative position embracing the end of the tool to be dressed, the inward projections 27 of the die members fitting into the water courses of the tool. The crosshead 38 continues its downward movement until the tapered opening 39 embraces the tapered projections 35, thus firmly maintaining the die members in operative position. The die members are, as already stated, supported from below by the cross bars 8, and they are held down by the cross bar 24. Transverse movement of the die members is prevented by engagement of the respective projections 26 and 35 in the respective openings 29 and 39. The crosshead 38 carries a guide member 38a cooperating with the uprights 13 to guide the crosshead in its vertical movement.

Figure 2:
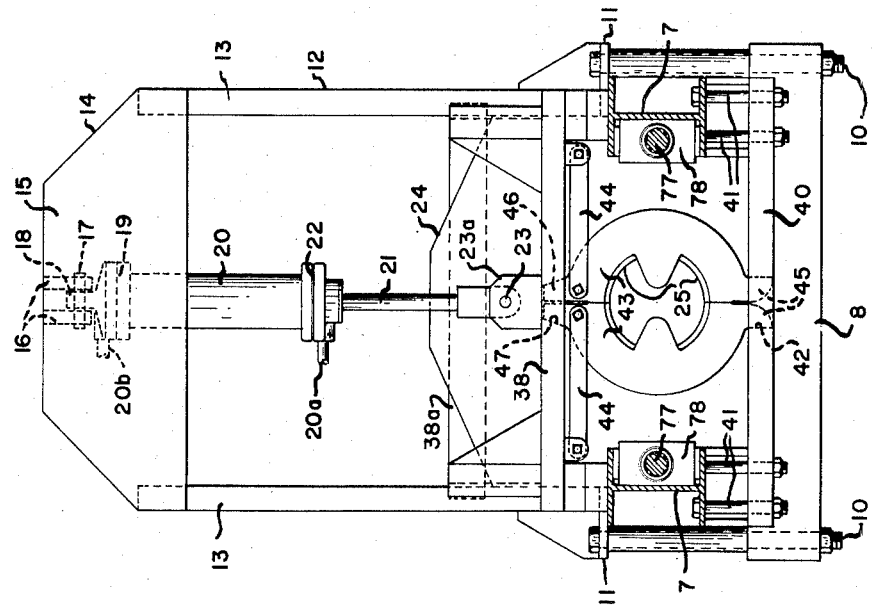
Figure 2 is a vertical transverse cross-sectional view to enlarged scale taken on the line II—II of Figure 1 and showing the trimming die in operative position.
Figure 3:
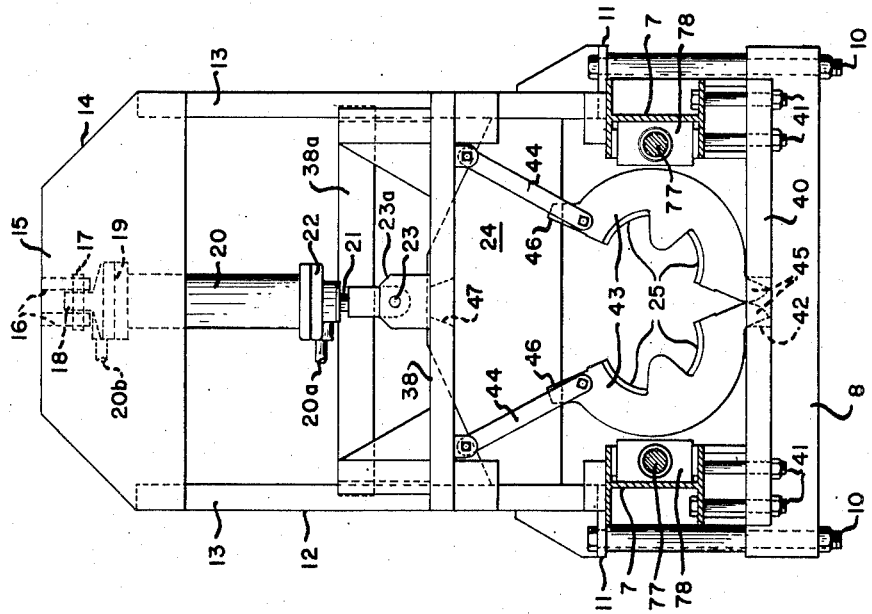
Figure 3 is a view similar to Figure 2 but showing the trimming die in open or inoperative position ready to receive a tool to be dressed.

In addition to the dressing die just described I provide a trimming die through which the dressed tool is adapted to be drawn at the conclusion of the dressing operation to trim off any flash adhering to the dressed end of the tool. The trimming die is of a cross-sectional shape similar to that of the dressing die and operates in the same way, being moved between open and closed positions by the piston in the cylinder 20. The trimming die is shown in operative position in Figure 2 and in open or inoperative position in Figure 3. In those figures the dressing die is behind the trimming die and since it is of a cross-sectional shape similar to that of the trimming die the dressing die is largely obscured from view by the trimming die.

A cross member 40 is carried by the frame 2 below the H-beams 7 by bolts 41. The cross member 40 has therein an opening 42 analogous to the opening 29. The trimming die members are each designated 43 and as already stated are of a cross-sectional shape similar to that of the dressing members. Links 44 pivotally connect the trimming die members 43 with the crosshead 38 in the same manner as the links 31 connect the dressing die members 25 with the same crosshead. The trimming die members 43 have downward projections 45 at their bottoms and upward projections 46 at their upper portions, those projections being analogous to the projections 26 and 35, respectively, of the dressing die. The crosshead 38 has a second opening 47 functioning in the same way as the opening 39 but to maintain the trimming die members in operative position.

The operations above described for opening and closing the dressing die bring about simultaneous opening and closing of the trimming die, the two dies being always operated in unison by the piston in the cylinder 20.

A cross member 48 of the chassis (Figures 1 and 6) has a lug 49 projecting longitudinally generally along the center line of the chassis and a cylinder 50 is connected to the lug 49 by a pin 51 passing through a lug 52 carried by the left-hand cylinder head 53 of the cylinder 50 viewing Figure 6. A piston operates in the cylinder 50 and a piston rod 54 which is connected with the piston emerges from the cylinder through the right-hand cylinder head 55 viewing Figure 6. The piston rod 54 is connected with a collar 56 which surrounds a shaft 57 extending transversely of the machine. The ends of the shaft 57 are mounted in shoes 58 which are guided for longitudinal movement in guides 59 carried by the chassis. Thus when the piston is moved in the cylinder 50 the shaft 57 moves longitudinally of the machine, being guided in such movement by the guides 59.

Pivoted to the shaft 57 are levers 60 connected together by a cross member 61 so that the assembly of the levers 60 and the cross member 61 forms a structural unit of the machine. Spacers 62 on the shaft 57 insure proper positioning of the levers 60 transversely of the machine.

Figure 7:
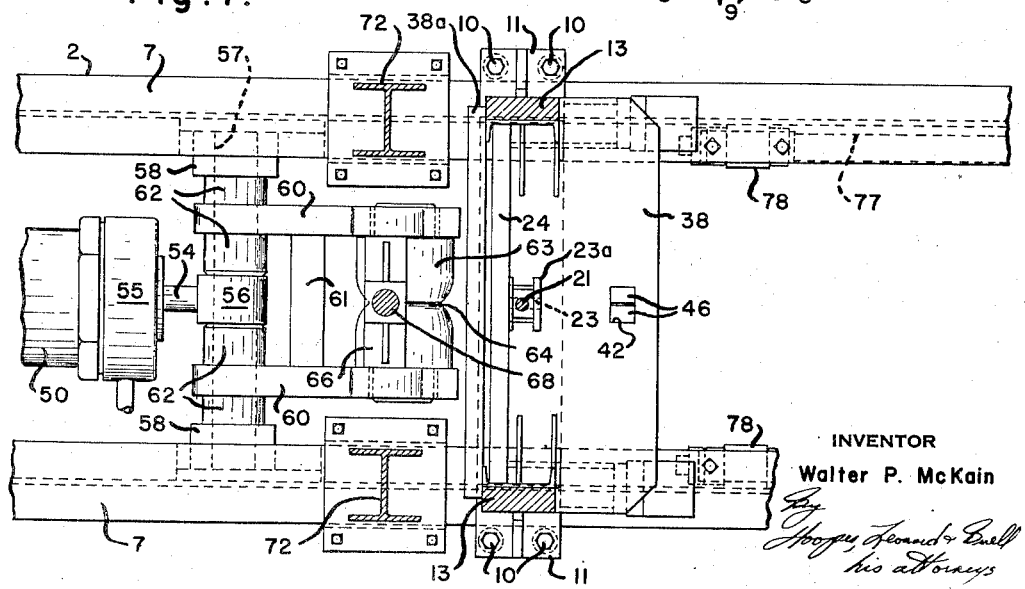
Figure 7 is a fragmentary horizontal cross-sectional view taken on the line VII—VII of Figure 6.

Each of the levers 60 projects past the cross member 61 and the levers have journaled in their projecting portions a dressing roll 63. The dressing roll 63 is freely rotatable and is of generally cylindrical shape but with an annular shaping recess 64 at its central portion as shown in Figure 7. The operative face of the dressing die is complementarily shaped.

Each of the levers 60 has a generally upward projection 65 and a pin 66 extends parallel to the cross member 61 and enters both projections 65. The axis of the pin 66 is somewhat to the left of the axis of the dressing roll viewing Figure 6. The pin 66 has connected therewith at its central portion a connector 67 to which in turn is connected a piston rod 68. The piston rod 68 is connected with a piston in a cylinder 69 trunnioned at 70 to a cross member 71 supported by upright H-beams 72. Movement of the piston in the cylinder 69 causes the dressing roll 63 to roll over the operative end of the tool gripped within the dressing die which is being dressed by hot forging. The end of the tool is, of course, raised to forging temperature before it is introduced into the tool dressing machine. When it is gripped by the dressing die and maintained firmly in position longitudinally of the machine the piston in the cylinder 50 is moved toward the right viewing Figure 6 to press the dressing roll 63 against the end of the tool and against the operative face 28 of the dressing die to dress the tool. At the same time the piston in the cylinder 69 is moved up and down so that the dressing roll 63 rolls back and forth in contact with the operative face 28 of the dressing die to dress the tool. During the dressing or hot forging operation the tool may by means presently to be described be advanced toward the left viewing Figure 6 to insure adequate dressing of the operative end of the tool. The dressing roll 63 shapes the end of the tool and squeezes off some of the hot metal of the tool against the dressing die. Some of the metal may adhere to the dressed tool as flash. At the conclusion of the dressing operation the dressed tool is withdrawn toward the right viewing Figure 6 through the trimming die which trims off the flash.

The axis of the pin 66 is somewhat to the left of the axis of the dressing roll viewing Figure 6 to permit full action of the dressing roll from the top end to the bottom end of the operative face 28 of the dressing die without danger that the projections 65 will strike against the die or the supporting structure for the die. During movement of the dressing roll along the tool and dressing die the levers 60 pivot about the axis of the shaft 57. The shaft 57 is free to move longitudinally of the machine but is restrained against upward or downward movement by the guides 59.

Mounted atop the cross member 71 is a mast 73 swivelly carrying a generally horizontally projecting arm 74 supported by a tie rod 75, the arm 74 also serving as a track for a chain hoist 76 to assist in handling the heavy tools into and out of the machine.

Means must be provided to support the long heavy tool in the tool dressing machine during dressing of the tool. The cutting end of the tool is supported in the dressing die. I provide a support for the opposite or head end of the tool, which support may be moved to desired adjusted positions longitudinally of the tool dressing machine to accommodate tools of different lengths. Also I provide for applying to the dressed tool sufficient force to draw it through the trimming die after the dressing operation has been concluded.

Two identical screws 77 are rotatably mounted in parallel relationship extending longitudinally of the tool dressing machine inside the respective H-beams 7. Each of the screws 77 is journaled adjacent both ends in bearings 78. At the right-hand end of the machine viewing Figure 1 a shaft 79 (Figures 13 and 14) is journaled in bearings 80, the shaft 79 extending longitudinally of the machine generally centrally thereof. Freely rotatable on the shaft 79 is a sleeve 81 with which a pinion 82 and a gear 83 are integral. The gear 83 meshes with a pinion 84 keyed to a shaft 85 which is the shaft of a fluid motor 86. The end of the shaft at the opposite side of the pinion 84 from the fluid motor 86 is splined as shown at 87 to receive a hand crank 88 shown in chain lines in Figure 13 to turn the shaft 85. Thus the shaft 85 may be turned either by the fluid motor 86 or by the hand crank 88.

Figure 13:
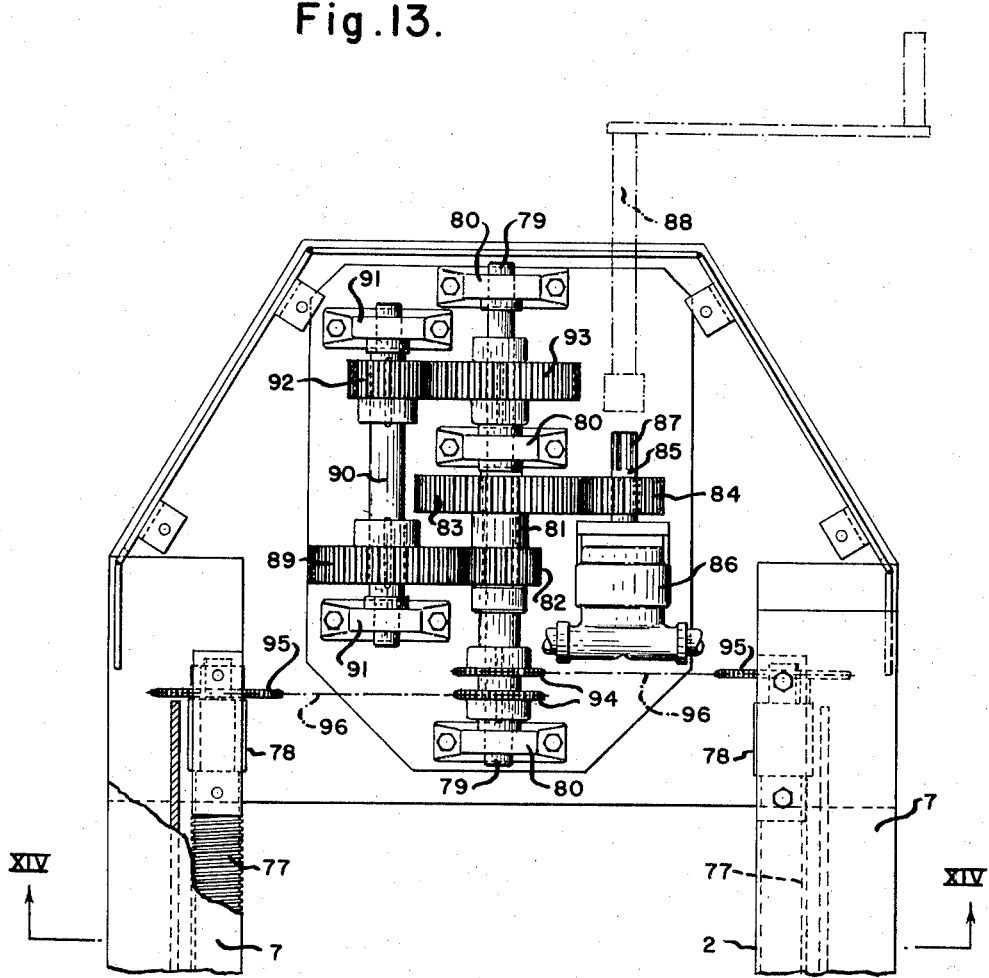
Figure 13 is a partial top plan view of the machine with the top cover plate removed and showing power transmission gearing.
Figure 14:
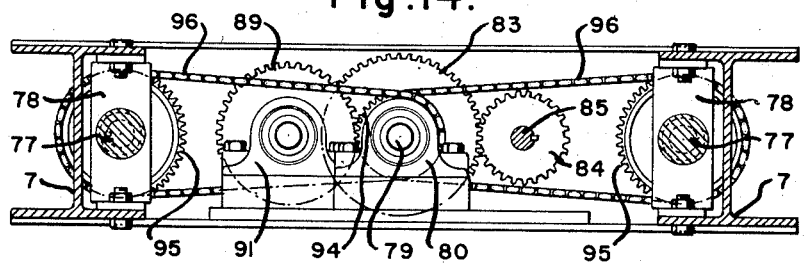
Figure 14 is a vertical transverse cross-sectional view taken on the line XIV—XIV of Figure 13.

The pinion 82 meshes with a gear 89 keyed to a shaft 90 journaled in bearings 91. Also keyed to the shaft 90 is a pinion 92 which meshes with a gear 93 keyed to the shaft 79. Also keyed to the shaft 79 are two sprockets 94. Fixed to the respective screws 77 are sprockets 95. Sprocket chains 96 are trained about the respective pairs of sprockets 94 and 95 as shown in Figure 13. By that mechanism the screws 77 may be turned in unison in either direction.

Figure 8:
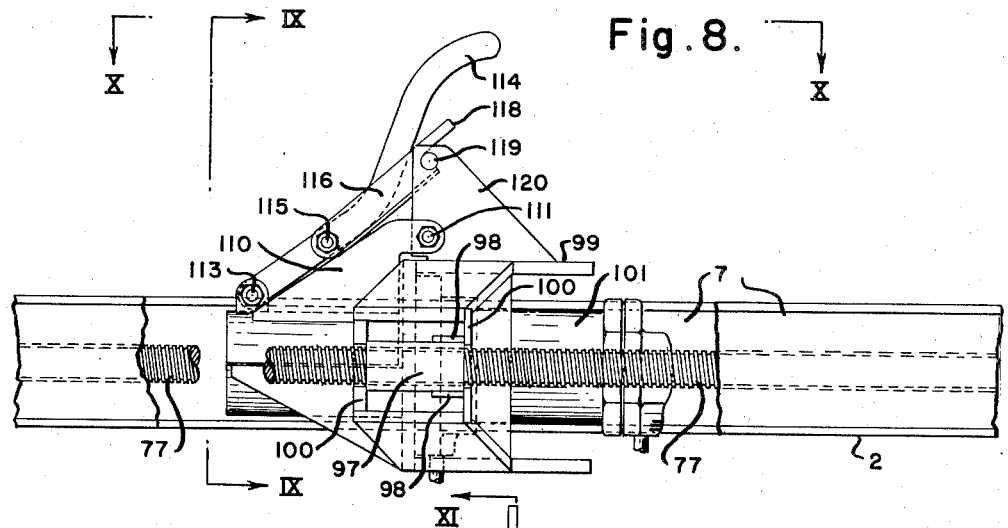
Figure 8 is a fragmentary elevational view to enlarged scale of a portion of the machine shown in Figure 1 with a portion of the main frame member in the foreground cut away.
Figure 9:
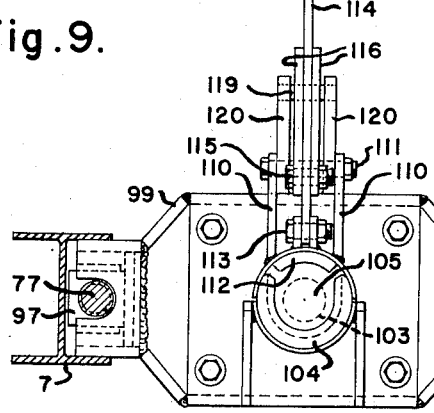
Figure 9 is a vertical transverse cross-sectional view taken on the line IX—IX of Figure 8.
Figure 10:
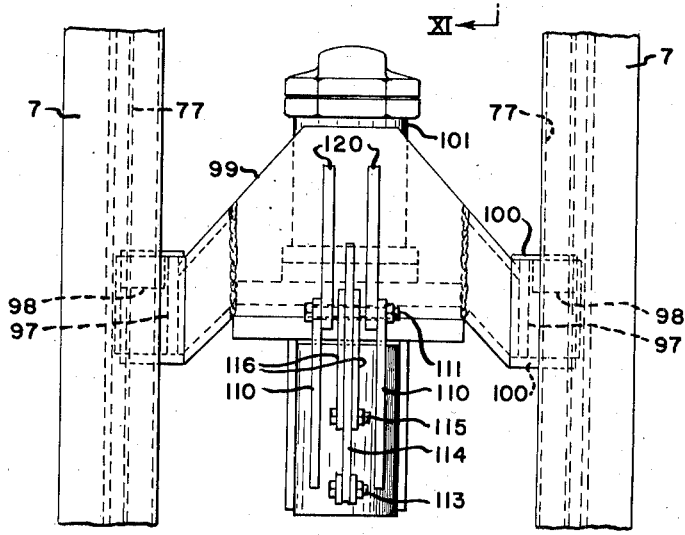
Figure 10 is a fragmentary plan view looking down upon Figure 8 as indicated by the line X—X.

Opposed nuts 97 extend about and are in mesh with the respective screws 77 in the same transverse zone of the machine. The nuts 97 are square (Figure 9) and are received in pockets formed by plates 98 of a carriage designated generally by reference numeral 99. Other plates 100 (Figure 8) prevent the nuts 97 from moving axially relatively to the carriage. Thus when the screws 77 turn simultaneously in one direction the carriage 99 is by the screws moved longitudinally of the bit dressing machine in one direction and when the screws 77 turn simultaneously in the opposite direction the carriage is moved in the opposite direction.

The carriage 99 has generally centrally of the tool dressing machine in the transverse direction and generally in line with the dressing and stripping dies a cylinder 101 in which operates a piston 102 having a piston rod 103. The piston rod 103 carries a connecting member 104 having therein an upwardly open recess 105 for receiving a flange 106 of an adapter 107 adapted to be applied to the head end of a tool or bit 108, i. e., the end of the tool or bit opposite the end to be dressed. The adapter 107 is applied to the tool by screwing it onto the threaded end 109 of the tool.

A latch 110 is pivoted to the carriage at 111 and comprises a hold-down portion 112 adapted when the latch is moved to operative position as shown in Figure 11 to hold the adapter 107 with the flange 106 in the recess 105, the holddown portion 112 lying against the shank of the adapter 107 in all positions of the piston 102 in the cylinder 101. Thus the latch 110 prevents inadvertent disconnection of the adapter from the connecting member 104. Pivoted to the latch 110 at 113 is a handle 114. Pivoted to the handle 114 at 115 is a detent 116, the detent 116 having at its extremity a recess 117 with a projecting finger 118 at one side thereof.

When the latch 110 is moved from the inoperative position shown in Figure 12 to the operative position shown in Figure 11 the hold-down portion 112 of the latch effectively insures against disconnection of the adapter 107 from the connecting member 104 and the detent 116 rides over a pin 119 carried by a plate 120 on the carriage until the pin lies beyond the recess 117 against the under surface of the finger 118. At that time the handle 114 is turned in the clockwise direction about the axis of the pivot 113 to act as a toggle to maintain the detent operative to hold the latch in place. When the latch is to be rendered inoperative the handle 114 is turned in the counter clockwise direction about the axis of the pivot 113 to disengage the detent 116 from the pin 119 after which the latch can be raised to the inoperative position shown in Figure 12.

When a tool is to be dressed the adapter 107 is screwed onto the head or pin end of the tool and cutting end of the tool is raised to forging temperature. By use of the chain hoist the tool is positioned in the tool dressing machine. As the tool is brought into place the dressing and trimming dies are open and the operative end of the tool is positioned in the dressing die. The screws 77 are turned to bring the connecting member 104 into the same transverse zone as the flange 106 of the adapter 107 whereupon the flange 106 is disposed in the recess 105 and the latch 110 is moved to its operative position as shown in Figure 11. The dressing and trimming dies are closed. The carriage 99 is by operation of the screws 77 moved toward the left viewing Figures 1 and 12 until the connecting member 104 seats against the thrust plate 104a carried by the carriage 99. The dressing roll 63 is pressed against the heated end of the tool and against the dressing die and rolled thereagainst as above described. During the dressing or hot forging operation it may be desirable to advance the tool toward the left viewing Figure 1 to insure adequate operation of the dressing roll on the cutting end of the tool to completely shape or dress the end of the tool. Such advance of the tool is effected by turning of the screws 77 which move the carriage 99 to the left viewing Figures 1 and 12; the thrust plate 104a acting against the connecting member 104 moves the tool to the desired position. However, at times sufficient force to move the tool in the dressing die may not be afforded by the fluid motor 86 which drives the screws 77. At such times the piston 102 is moved a short distance to the left in the cylinder 101 to advance the tool the desired distance and thereafter the carriage 99 is by the screws 77 moved toward the left until the connecting member 104 again seats against the thrust plate 104a. The tool may be thus advanced one or more, usually several, times during the dressing operation.

After the dressing of the tool has been completed the flash on the dressed end of the tool may overlap the dressing die and thus prevent opening of the dies. Accordingly I admit fluid under pressure to the right of the piston 102 in the cylinder 101 and move the piston to the left in the cylinder 101 to the position shown in Figure 12, which movement of the piston moves the dressed tool to the left viewing Figures 1 and 12 so that the flash clears the dressing die, whereupon the dies may be opened. The dies are opened and then by turning the screws 77 the carriage 99 and the dressed tool are moved toward the right viewing Figures 1, 6 and 12 until the dressed end of the tool clears the dressing die, i. e., until the extremity of the dressed tool is disposed to the right of the dressing die but to the left of the trimming die viewing Figure 6. Thereupon the dies are closed and fluid under pressure is admitted into the cylinder 101 to the left of the piston 102 viewing Figure 12 to apply great force to the tool to draw it toward the right viewing Figures 1, 6 and 12 through the trimming die whereby to trim off the flash left in the forging operation. The cylinder 101 is preferably made long enough so that during travel of the piston therein the dressed end of the tool is drawn completely through the trimming die. If, however, the dressed end of the tool should not be drawn completely through the trimming die before the piston 102 reaches the right-hand end of the cylinder 101 the pressure to the left of the piston 102 viewing Figure 12 may be relieved and the screws 77 may be turned to move the carriage 99 to the right until the piston reaches the left-hand end of the cylinder as shown in Figure 12 whereupon fluid under pressure may again be admitted to the left of the piston to move the piston toward the right and thus force the dressed tool through the trimming die.

Mounted on the chassis is an engine 121, which may, for example, be a gasoline engine, which drives a fluid pump 122. A reservoir 123 for the actuating fluid is provided and conduits for conducting the actuating fluid under pressure from the pump to the cylinders 20, 50, 69 and 101 and the fluid motor 86 together with suitable control valves for the respective units are provided. The actuating fluid may be any suitable hydraulic fluid such as oil.

Figures 15, 16 and 17 show a modified form of dressing die. In those figures parts corresponding to parts shown in Figure 4 are designated by the same reference numerals each with a prime affixed. In the form of die shown in Figures 15, 16 and 17 the die is in four parts, a stationary bottom part 124, a top part 125 carried by the crosshead 38' and two side parts 126 which have a sliding dovetail connection with the stationary die part 124 so that they can move inwardly and outwardly between the respective positions shown in Figures 15 and 16.

A pair of levers 127 each has a rounded lower extremity 128 operating within an opening 129, and each lever 127 is pivotally connected with the corresponding die part 126 at 130. The upper end of each lever 127 is pivoted at 131 to a link 132 which is pivoted at 133 to the crosshead 38'.

When the die parts are in the open or inoperative position shown in Figure 16 and the crosshead 38' is moved downwardly the links 132 cause the upper ends of the levers 127 to move inwardly and the levers 127 cause the die parts 126 to move inwardly along their sliding dovetail connections with the die part 124. At the same time the die part 125 moves downwardly and ultimately all of the die parts 124, 125 and 126 reach the position of Figure 15 in which they fit together to form a complete continuous dressing die. The crosshead 38' has downward projections 134 which when the die parts have reached operative position bear against the outer portions of the parts 126 to relieve the pivots 130 of a portion of the strain when the die is in use in dressing a tool. There is a tendency for the metal of the tool as it is being forged to press the die parts 126 outwardly, that tendency being resisted by the projections 134 as well as by the pivots 130.

While I have shown and described certain present preferred embodiments of the invention it is to be distinctly understood that the invention is not limited thereto but may be otherwise variously embodied within the scope of the following claims.

I claim:

1. In a machine for dressing tools, complementary die members, means including generally pivotal connections mounting the die members for turning movement between open inoperative position permitting a tool to be dressed to be introduced therebetween and closed operative position forming a die embracing the tool, a member mounted for movement transversely of the axis of the die toward and away from the die members and means including link means joining said member and at least certain of the die members cooperating with the die members when the die members are in operative position and said member is moved toward the die members to hold the die members in operative position.

2. In a machine for dressing tools, complementary die members, means including generally pivotal connections mounting the die members for turning movement between open inoperative position permitting a tool to be dressed to be introduced therebetween and closed operative position forming a die embracing the tool, a member mounted for movement transversely of the axis of the die toward and away from the die members, connections between said member and at least certain of the die members moving such die members to inoperative position when said member is moved away from the die members, said member also having means cooperating with at least certain of the die members when the die members are in operative position and said member is moved toward the die members to hold the die members in operative position.

3. In a machine for dressing tools, opposed complementary die members, means mounting the die members for swinging movement substantially about adjacent portions of the die members between open inoperative position permitting a tool to be dressed to be introduced therebetween and closed operative position forming a die embracing the tool, a member mounted for movement transversely of the axis of the die toward and away from the die members, links linking said member with the respective die members causing the die members to move to inoperative position when said member is moved away from the die members and causing the die members to move to operative position when said member is moved toward the die members, said member also having means cooperating with the die members when the die members are in operative position and said member is moved toward the die members to hold the die members in operative position.

4. In a machine for dressing tools, opposed complementary die members, means mounting the die members for swinging movement substantially about adjacent portions of the die members between open inoperative position permitting a tool to be dressed to be introduced therebetween and closed operative position forming a die embracing the tool, a guideway extending transversely of the axis of the die, a crosshead mounted for movement in the guideway toward and away from the die members, means for moving the crosshead in the guideway, links linking the crosshead with the respective die members causing the die members to move to inoperative position when the crosshead is moved away from the die members and causing the die members to move to operative position when the crosshead is moved toward the die members, the crosshead also having means cooperating with the die members when the die members are in operative position and the crosshead is moved toward the die members to hold the die members in operative position.

5. In a machine for dressing tools, complementary die members including a substantially fixed die member and at least one other die member movable relatively to the substantially fixed die member between open inoperative position relatively thereto permitting a tool to be dressed to be introduced therebetween and closed operative position relatively to the substantially fixed die member forming a die embracing the tool and means engaging at least certain of the die members when the die members are in operative position to hold the die members in operative position.

6. In a machine for dressing tools, a fixed die member, a guideway extending toward the fixed die member, a crosshead mounted for movement in the guideway, a first movable die member carried by the crosshead, means for moving the crosshead in the guideway, two lateral die members movable toward and away from the central portion of the die, connections between the crosshead and the lateral die members moving the lateral die members away from the central portion of the die when the first movable die member moves away from the fixed die member and additional means carried by the crosshead engaging the lateral die members to maintain the lateral die members in operative position when the crosshead is at the end of its stroke toward the fixed die member.

7. In a machine for dressing tools, a dressing die, means for supporting a tool in cooperative relationship with the dressing die during dressing of the tool, means coacting with the dressing die to dress the tool, means for withdrawing the dressed tool from the dressing die generally axially of the dressing die and a trimming die through which the dressed portion of the tool passes upon withdrawal from the dressing die for trimming flash from the tool.

8. In a machine for dressing tools, a dressing die, means for supporting a tool in cooperative relationship with the dressing die during dressing of the tool, means coacting with the dressing die to dress the tool, means for withdrawing the dressed tool from the dressing die generally axially of the dressing die and an openable trimming die adapted to be opened to permit initial insertion of the tool and thereafter closed through which when the trimming die is closed the dressed portion of the tool passes upon withdrawal from the dressing die for trimming flash from the tool.

9. In a machine for dressing tools, a dressing die, means for supporting a tool in cooperative relationship with the dressing die during dressing of the tool, means coacting with the dressing die to dress the tool, means for withdrawing the dressed tool from the dressing die generally axially of the dressing die and a trimming die through which the dressed portion of the tool passes upon withdrawal from the dressing die for trimming flash from the tool, both the dressing die and the trimming die being openable to permit initial insertion of the tool.

10. In a machine for dressing tools, a dressing die, means for supporting a tool in cooperative relationship with the dressing die during dressing of the tool, means coacting with the dressing die to dress the tool, the dressing die being openable to permit initial insertion of the tool, means for opening and closing the dressing die, means for withdrawing the dressed tool from the dressing die generally axially of the dressing die and a trimming die through which the dressed portion of the tool passes upon withdrawal from the dressing die for trimming flash from the tool, the trimming die being openable to permit initial insertion of the tool, the trimming die being connected with the dressing die so that the trimming die opens and closes with the dressing die.

11. In a machine for dressing tools, a frame, a dressing die mounted in the frame adapted to receive a portion of a tool to be dressed, means for progressively advancing the tool relatively to the dressing die during dressing of the tool, a dressing member cooperable with the dressing die and movable relatively thereto to dress the tool, means for pressing the dressing member toward the dressing die and means mounted on the frame in fixed position axially of the dressing die moving the dressing member transversely of the dressing die.

12. In a machine for dressing tools, a dressing die adapted to receive a portion of a tool to be dressed, means for progressively advancing the tool relatively to the dressing die during dressing of the tool, a dressing member cooperable with the dressing die and movable relatively thereto to dress the tool, means for pressing the dressing member toward the dressing die, a cylinder mounted in fixed position axially of the dressing die with its axis transverse to the axis of the dressing die, a piston operating in the cylinder and a connection between the piston and the dressing member whereby the dressing member is moved transversely of the dressing die.

13. In a machine for dressing tools, a dressing die adapted to receive a portion of a tool to be dressed, means for progressively advancing the tool relatively to the dressing die during dressing of the tool, a dressing roll cooperable with the dressing die and movable relatively thereto to dress the tool, mounting means rotatably carrying the dressing roll, means for pressing the mounting means toward the dressing die and means mounted in fixed position axially of the dressing die moving the mounting means transversely of the dressing die.

14. In a machine for dressing tools, a dressing die adapted to receive a portion of a tool to be dressed, means for progressively advancing the tool relatively to the dressing die during dressing of the tool, a dressing member cooperable with the dressing die and movable relatively thereto to dress the tool, mounting means for the dressing member, a guideway extending generally parallel to the axis of the dressing die, a crosshead movable along the guideway, the mounting means being pivoted to the crosshead, means for pressing the crosshead along the guideway toward the dressing die and means for moving the mounting means about its pivotal connection with the crosshead.

15. In a machine for dressing tools, a dressing die adapted to receive a portion of a tool to be dressed, means for progressively advancing the tool relatively to the dressing die during dressing of the tool, a dressing roll cooperable with the dressing die and movable relatively thereto to dress the tool, mounting means rotatably carrying the dressing roll, a guideway extending generally parallel to the axis of the dressing die, a crosshead movable along the guideway, the mounting means being pivoted to the crosshead, means for pressing the crosshead along the guideway toward the dressing die and means mounted in fixed position axially of the dressing die moving the mounting means about its pivotal connection with the crosshead.

16. In a machine for dressing tools, a dressing die adapted to receive a portion of a tool to be dressed, means for progressively advancing the tool relatively to the dressing die during dressing of the tool, a dressing roll cooperable with the dressing die and movable relatively thereto to dress the tool, mounting means rotatably carrying the dressing roll, means for pressing the mounting means toward the dressing die, a cylinder mounted in fixed position axially of the dressing die with its axis transverse to the axis of the dressing die, a piston operating in the cylinder and a connection including a pivot between the piston and the mounting means whereby the mounting means is moved transversely of the dressing die, the axis of the pivot being more remote from the dressing die than the axis of the dressing roll when the axis of the dressing roll and the axis of the dressing die intersect.

17. In a machine for dressing tools, a dressing die having tool shaping means, dressing means cooperable with the dressing die and movable relatively thereto to dress the tool, a tool actuating carriage movable toward and away from the dressing die, tool engaging means carried by the carriage and means also carried by the carriage for moving the tool engaging means relatively to the carriage away from the dressing die.

18. In a machine for dressing tools, a frame, a dressing die having tool shaping means carried by the frame, dressing means cooperable with the dressing die and movable relatively thereto to dress the tool, a tool actuating carriage movable along the frame toward and away from the dressing die, screw means for moving the carriage along the frame, tool engaging means carried by the carriage and piston and cylinder means also carried by the carriage for moving the tool engaging means relatively to the carriage away from the dressing die.

19. In a machine for dressing tools, a dressing die having tool shaping means, a trimming die in general alignment with the dressing die and adapted to trim flash from a dressed tool withdrawn from the dressing die through the trimming die, a tool actuating carriage disposed so that the trimming die is between the carriage and the dressing die, the carriage being movable toward and away from the trimming die, tool engaging means carried by the carriage and means also carried by the carriage for moving the tool engaging means relatively to the carriage away from the trimming die.

20. In a machine for dressing tools, a frame, a dressing die having tool shaping means carried by the frame, a trimming die in general alignment with the dressing die and adapted to trim flash from a dressed tool withdrawn from the dressing die through the trimming die, the dressing and trimming dies being openable to permit insertion of a tool and closable generally about the tool, a tool actuating carriage disposed so that the trimming die is between the carriage and the dressing die, the carriage being movable along the frame toward and away from the dressing die, screw means for moving the carriage along the frame, tool engaging means carried by the carriage and piston and cylinder means also carried by the carriage for moving the tool engaging means relatively to the carriage away from the trimming die.

21. In a machine for dressing tools, a frame, a dressing die having tool shaping means carried by the frame, a trimming die in general alignment with the dressing die and adapted to trim flash from a dressed tool withdrawn from the dressing die through the trimming die, the dressing and trimming dies being openable to permit insertion of a tool and closable generally about the tool, a tool actuating carriage disposed so that the trimming die is between the carriage and the dressing die, the carriage being movable along the frame toward and away from the dressing die, screw means for moving the carriage along the frame, tool engaging means carried by the carriage, latch means for latching the tool engaging means to a tool and piston and cylinder means also carried by the carriage for moving the tool engaging means relatively to the carriage away from the trimming die.

References Cited in the file of this patent

UNITED STATES PATENTS

| | | |
|---|---|---|
| 278,915 | Emery | June 5, 1883 |
| 590,148 | Hall | Sept. 14, 1897 |
| 601,566 | Huston | Mar. 29, 1898 |
| 603,096 | Worth | Apr. 26, 1898 |
| 949,040 | Morgan | Feb. 15, 1910 |
| 1,058,775 | McKillop | Apr. 15, 1913 |
| 1,159,722 | Skaer | Nov. 9, 1915 |
| 1,317,049 | Smith | Sept. 23, 1919 |
| 1,885,648 | Wilcox | Nov. 1, 1932 |
| 2,443,814 | Curtis | June 22, 1948 |
| 2,615,353 | Ives | Oct. 28, 1952 |
| 2,647,454 | Shelley | Aug. 4, 1953 |
| 2,651,888 | Comstock | Sept. 15, 1953 |
| 2,656,748 | Hugo | Oct. 27, 1953 |
| 2,688,144 | Berkey | Sept. 7, 1954 |

FOREIGN PATENTS

| | | |
|---|---|---|
| 12,777 | Great Britain | June 6, 1904 |

U. S. DEPARTMENT OF COMMERCE
PATENT OFFICE

CERTIFICATE OF CORRECTION

Patent No. 2,832,236      Walter P. McKain      April 29, 1958

It is hereby certified that error appears in the printed specification of the above numbered patent requiring correction and that the said Letters Patent should read as corrected below.

Column 1, line 25, before "its initial" strike out "in"; column 2, line 29, for "may", first occurrence, read -- my --; line 61, for "dis" read -- die --; column 3, line 19, after "Figure 1" insert -- and --; column 5, lines 52 and 53, for "opeated" read -- operated --.

Signed and sealed this 10th day of June 1958.

(SEAL)
Attest:

KARL H. AXLINE
Attesting Officer

ROBERT C. WATSON
Commissioner of Patents